Aug. 29, 1933.                A. PETELER                1,924,372
                             SHOCK ABSORBER
                           Filed Oct. 16, 1929
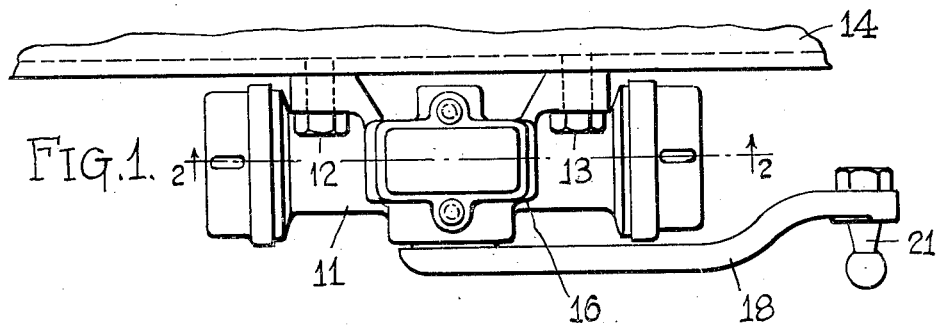
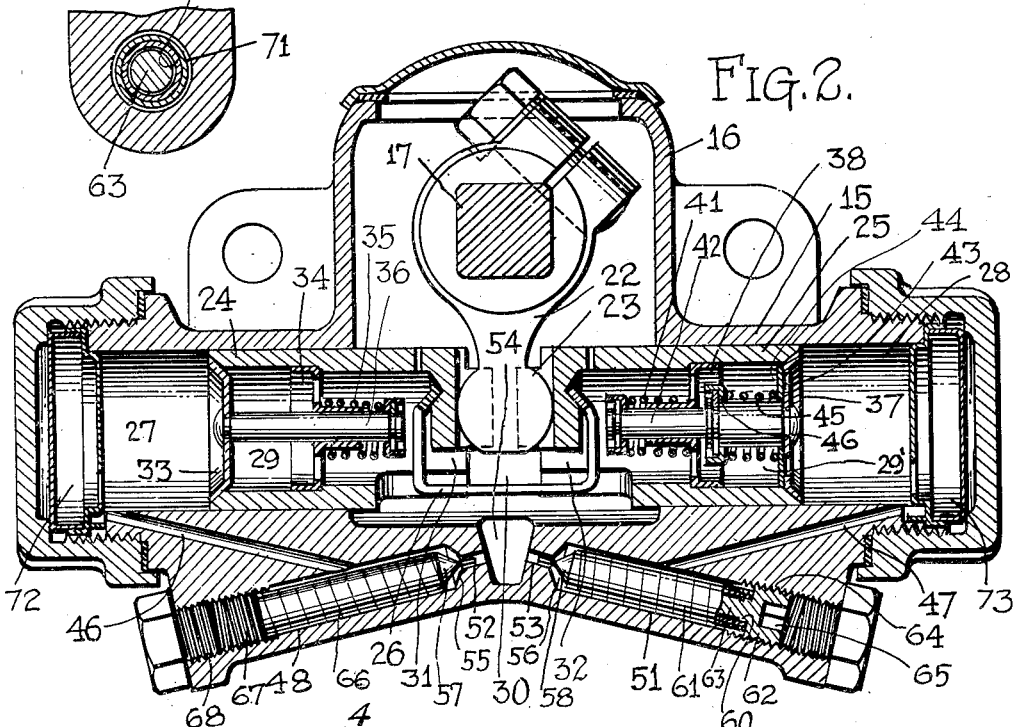
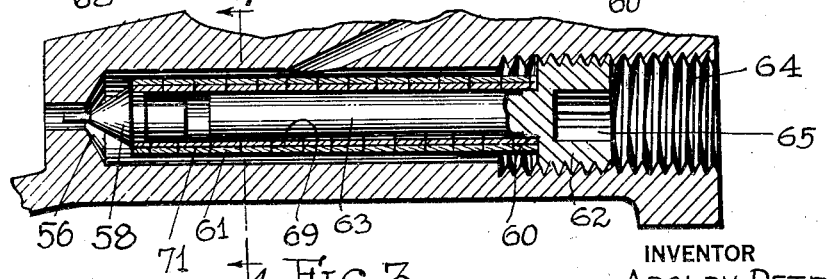
INVENTOR
ADOLPH PETELER.
BY
ATTORNEY Patented Aug. 29, 1933

1,924,372

UNITED STATES PATENT OFFICE 1,924,372

SHOCK ABSORBER

Adolph Peteler, Freeport, N. Y.

Application October 16, 1929. Serial No. 399,992

16 Claims. (Cl. 188—88)

My invention relates to hydraulic shock absorbers and to improved thermostats suitable for use therewith.

Prior to my invention hydraulic shock absorbers have been used and means have been provided, associated therewith, for manually adjusting the size of the passages through which the liquid flows, in order to regulate the resistance of the liquid to movement, but no means have hitherto been provided for automatically adjusting the size of the opening. Oil is usually used as the liquid in such shock absorbers and inasmuch as the viscosity of oil varies with the temperature and it is impractical to continuously adjust the size of the passages manually, the resistance of the shock absorber in all prior devices of this character is not uniform but continuously varies with the temperature.

Thermostats in use prior to my invention have usually been of one of two classes. One type of thermostat comprises a metallic bar which increases in length upon any rise in temperature and thereby either controls an electric switch or performs some other useful function. Such thermostats usually require much space because of the comparatively small expansion for any given length of the bar. A second type of thermostat comprises a strip composed of two metals, one having a low coefficient of expansion and the other having a high coefficient of expansion and the strip having one end fixed and the other end free. When the temperature increases or decreases, the strip bends respectively toward or away from the metal of low coefficient of expansion and the free end thereof moves laterally a substantial distance. This free end is used to perform whatever useful function may be desired. This type of thermostat is subject to the disadvantage, however, that it is resilient and will not withstand high pressures.

One of the objects of my invention is to provide a novel thermostat of improved design.

A further object of my invention is to provide a more efficient shock absorber which will have uniform action in all usual temperatures.

A further object of my invention is to provide a thermostat of comparatively small size capable of withstanding large pressures without bending.

A further object of my invention is to provide in a shock absorber, a control valve, automatically movable responsive to temperature variations and also independently adjustable from without.

Further objects will be apparent from a reading of the subjoined specification and claims and from a consideration of the drawing.

In order to explain the invention more clearly, one embodiment thereof is shown in the accompanying drawing, in which:

Fig. 1 is a plan view of one form of shock absorber constructed according to my invention;

Fig. 2 is a view in section taken on the line 2—2 of Fig. 1 and showing the details of the shock absorber of Fig. 1;

Fig. 3 is an enlarged sectional detail of a thermostat constructed according to my invention, which thermostat is used in the improved shock absorber shown in Fig. 2; and Fig. 4 is a view in section of the thermostat shown in Fig. 3 taken on the line 4—4 thereof.

In general, the device used to illustrate my invention comprises a shock absorber constructed largely in accordance with the shock absorber disclosed in my co-pending application, Serial Number 338,069, filed February 7, 1929. However, instead of having the by-pass bores arranged in the upper part of the cylindrical portion of the device, I have in lieu thereof provided two pairs of intersecting bores positioned below the cylindrical portion. Positioned within one bore of each pair of these bores is one of my improved thermostatically controlled needle valves. The thermostat itself comprises a coiled strip formed of two layers of metal. The inner layer has a low coefficient of expansion and the outer layer has a high coefficient of expansion so that when the thermostat is cooled it tends to unbend, to increase in diameter and uncoil, and thus lessens the number of turns longitudinally of the coil and shortens the coil. On the other hand, when the thermostat is heated, the outer layer expands faster than the inner layer and thus causes the thermostat to decrease in diameter and coil more tightly, and to increase the number of turns longitudinally of the thermostat and thus to increase the length of the thermostat. Regardless of the temperature and of the length of the thermostat, there is always provided a solid support extending from one end of the thermostat to the other by reason of the contact of the turns of the coil with each other. Thus by the action of my thermostatically controlled needle valves, I am enabled to automatically constrict the size of the passages as the temperature increases and thus to compensate for the decreased viscosity of the oil when heated.

The drawing shows one form of vehicle shock absorber illustrative of my invention. Referring particularly thereto and especially to Fig. 1, the shock absorber may be seen to comprise a casing generally designated 11 which may be attached by any suitable means such as the bolts 12 and 13 to any convenient part of the chassis 14 of the vehicle. The casing may include a lower cylinder 15 (See Fig. 2) and an upper dome portion 16. Extending transversely through the dome portion 16 is a shaft 17 which carries pivoted on its outer end (See Fig. 1) a movable lever arm 18. The outer end of the arm 18 may be fastened by any suitable means such as that indicated at 21 to an axle of the vehicle. It may thus be seen that movement of the axle relative to the chassis causes a turning movement of the shaft 17 within the casing 11.

I provide a hydraulic resistance to rotation of the shaft 17 in order that the relative movement of the axle and the chassis of the vehicle may be cushioned. As shown in Fig. 2, the shaft 17 carries within the casing 11 a lever 22 having a lower thrust member 23 positioned within the cylinder 15 of the casing 11. Also positioned within the cylinder 15 are a pair of liquid tight pistons generally designated 24 and 25, placed one on each side of the thrust member 23 and continuously maintained in contact therewith by a spring 26 which connects the two pistons and continuously urges them toward each other. As may thus be seen turning movement of the shaft 17 causes movement of both pistons 24 and 25 within the cylinder 15. The casing 11 is adapted to be partly filled with a suitable liquid such as oil, which will resist movement of the pistons 24 and 25, and thus resist relative movement of the axle and the chassis.

Means are provided for allowing the controlled flow of liquid between the ends 27 and 28 of the cylinder 15 and thus for allowing cushioned movement of the pistons 24 and 25 in the casing 11 and consequently cushioned movement of the chassis of the vehicle relative to the axle thereof. The pistons 24 and 25 are hollow as at 29 and 29' and the hollow portions are freely interconnected through the passages 31 and 32 and the central reservoir 30. A check valve 33 for the piston 24 mounted in a spider 34 and normally held on its seat by a spring 35 fastened to the inner end of a valve stem 36, allows free movement of the oil from the central reservoir 30 into the end 27. However, it prevents the direct return of the oil from the end 27 to said central reservoir. Similarly, a check valve 37 for the piston 25, mounted in a spider 38 and normally held on its seat by a spring 41 fastened to the inner end of a valve stem 42, allows free movement of the oil from the central reservoir 30 to the end 28. However, it normally prevents the direct return of the oil from the end 28 to the central hollow reservoir 30.

The valve 37 is provided with a safety relief means in order to guard against breakage of parts by reason of an excessively heavy and sudden shock being transmitted to the arm 18. This safety relief means comprises a plurality of holes 43 formed in the valve 37, a plate 44 positioned inside of the valve around the stem 42 and normally held to cover the holes 43 by a relatively strong spring 45 bearing on a flange 46 on the stem 42. When any excessive force is transmitted to move the piston 25, the plate 44 may lift and allow the escape of oil past it.

Restricted passages are provided by which oil may pass from the ends 27 and 28 to the central reservoir 30 but because of the small size of the passages it may not pass freely as it does when passing from said central reservoir outward. The lower enlarged portion of the cylinder 15 has two restricted bores 46 and 47 leading respectively from the ends 27 and 28, downward at an angle. The bores 46 and 47 intersect respectively with bores 48 and 51 the latter pair extending upward at an angle. The bores 48 and 51 are, for purposes later to be described, formed slightly larger than the bores 46 and 47 and are connected respectively at their upper ends by smaller bores 52 and 53 with the common chamber 54 leading to the hollow central reservoir 30. It is thus clear that oil may be forced from the end 27 through the bore 46 into the bore 48 and thence through the bore 52, the chamber 54 the reservoir 30 and the valve 37 into the end 28. Likewise oil may be forced from the end 28 through the bore 47, the bore 51, the bore 53, the chamber 54, the reservoir 30 and the valve 33 into the end 27.

I provide additional devices for regulatively retarding the passage of oil through the passages described in the last paragraph, such devices including means for manually adjusting the amount of the retardation and means for automatically adjusting such retardation dependent upon the temperature variation. The upper ends of the enlarged bores 48 and 51 are formed with conical seats 55 and 56 respectively and thermostatically controlled needle valves 57 and 58 are arranged within said enlarged bores, the size of the bores and the thermostats and needle valves being so proportioned that a space is provided between them for the passage of oil. The valves are arranged to be moved toward and away from the seats 55 and 56, respectively in order to regulatively constrict the size of the passages between the bore 48 and the bore 52 and between the bore 51 and the bore 53. As shown clearly in Fig. 3, the needle valve 58 is carried on the inner end of one of my improved thermostats 61. The outer end of the thermostat is fastened to the adjusting screw 62 at 60, the thermostat 61 thus forming the sole connection between the adjusting screw 62 and the needle valve 58. The adjusting screw 62 has formed integrally therewith a rod 63 which forms a guide for the thermostat 61 to prevent the coils thereof from buckling or lapping. The adjusting screw 62 is externally screw threaded and is screwed into the internal screw threads 64 of the bore 51. The adjusting screw 62 also has formed in the head thereof a hexagonal socket 65 for the insertion of a suitable tool to be used in the manual adjustment thereof.

The needle valve 57 is likewise carried on the inner end of one of my improved thermostats 66 which is exactly like the thermostat 61 and need not be further described in detail. The outer end of the thermostat 66 is fastened to an adjusting screw 67 similar in all respects to the screw 62 and screw threaded into the bore 48 as at 68.

My improved thermostat comprises a coil formed from a continuous unitary strip of two layers of metals of different coefficients of expansion. Preferably, though not necessarily, the strip is so formed that at all normal temperatures it will coil and so formed that adjacent turns of the coils will contact firmly with each other without overlapping and after being pulled apart and released will tend to spring back into contact. In the preferred embodiment illustrated I have shown a metal of low coefficient of expansion, which may be invar, positioned inside of the coil as at 69 and a metal of high coefficient of expansion, which may be brass, positioned outside of the coil as at 71.

The connection between the needle valves 57 and 58 and their adjusting screws 62 and 67 is thus rigid and solid at all times and is capable of withstanding the force of the shocks which may be imposed upon it by irregularities in the road.

However, changes of temperature will accurately vary the size of the passages between the bore 48 and the bore 52 and between the bore 51 and the bore 53 to compensate for the changes in viscosity of the oil also due to the temperature changes. As the temperature increases the outer metal will expand much faster than the inner metal and will consequently bend the strip inward causing the coil to be reduced in diameter and to be wound or coiled more tightly. This causes a powerful screw action upon the needle valves 57 and 58 which forces them towards their seats. There will also be a slight movement of the valves toward their seats caused directly by the longitudinal expansion of the metal in the coil due to the heat but this movement will be infinitesimal as compared to the movement of the valve 58 caused by the screw action incident upon the increased bending of the metal, the tighter winding of the coil, the decrease in diameter thereof and the consequent increase in the number of turns of equal width in the coil. When the temperature decreases there is an increase in diameter of the coil and a consequent shortening thereof. Thus, I have devised a thermostat which will control the size of the oil passages of the shock absorber to compensate for changes in viscosity of the oil and which is positive in its action, is capable of withstanding great pressures and may be confined in a relatively small space compared to the variations in length thereof caused by changes in temperature.

If desired air chambers 72 and 73 may be provided, as shown, for the purpose which will now be explained. When the car is running along a stretch of road that is in good condition there are always minor irregularities in the surface of the road that will cause the arm 18 to oscillate over a short arc, and it is desirable that the arm be left free for this slight normal oscillation without any resistance from the shock absorber. For this purpose there is formed an air cushion within the cylinder so that the first part of the movement of the piston must be used to compress the air cushion before any resistance is encountered. The air cushions are formed by placing circular boxes within which are the chambers 72 and 73. These boxes are air tight except for small openings adjacent to the bottom of each box. As the casing is filled with liquid, air is trapped in the upper part of each box. Upon movement of the piston in either direction, the first part of the movement serves merely to force the liquid into one of the boxes and compress the air in the upper part of the box. As soon as the air has become compressed to a certain extent, the piston meets resistance and the liquid is forced through the restricted passages provided. In this manner the air cushions provide for a limited amount of free movement of the piston in either direction.

In the operation of the shock absorber used for illustration of my invention, movement of the axle of the vehicle relative to the chassis 14, causes a pivotal movement of the shaft 17 and a consequent movement of the thrust member 23 in one direction or the other. This movement causes a coincident movement of the pistons 24 and 25 in the same direction. Assuming that the movement is to the left, liquid is forced from the end 27 through the proper constricted passages catalogued above past the needle valve 57 and finally into the end 28. If the movement is to the right, oil is forced through the other constricted passages catalogued above, past the needle valve 58 into the end 27. The size of the passages and especially the size of the passages past the needle valves 57 and 58 causes a yielding resistance to be imparted to the liquid and to relative movement of the axle and chassis and gives the desired easy riding qualities.

If the temperature increases the oil becomes less viscous and would be expected to impart less resistance. However, the temperature increase also causes a greater bending of the thermostatic strips, a tightening of the coils, a consequent lengthening thereof and thus the needle valves are moved closer to their seats and the passages made more restricted to compensate for the decreased viscosity of the oil. As the temperature drops, the thermostats similarly withdraw the needle valves to compensate for the increased viscosity of the oil. If desired at any time either of the needle valves may be manually adjusted to increase or decrease resistance of the oil at any selected temperature. While I have described the shock absorber as designed for the use of oil, I may, if desired, use any other suitable fluid.

I have shown my improved thermostat as a part of a shock absorber of a given type but it is to be understood that it is also useful in many other combinations.

It is further to be understood that while I have described the thermostat as having the layer of metal of low coefficient of expansion on the inside and the layer of metal of high coefficient on the outside, yet the thermostat can be constructed with the layers reversed, in which case the length of the coil would be decreased as the temperature rises and would be increased as the temperature is lowered.

Still further it is to be understood that the above described embodiment of the invention is for the purpose of illustration only and various changes may be made therein without departing from the spirit and scope of the invention.

I claim as my invention:

1. In combination, a hydraulic shock absorber having formed therein a passage thru which a cushioning liquid is adapted to be forced, a longitudinally wound thermostat adapted to wind and unwind due to temperature changes, and means responsive in its movement to the winding and unwinding action of said thermostat to vary the effective area of said passage.

2. In combination, a hydraulic shock absorber having formed therein a passage through which a cushioning liquid is adapted to be forced, a longitudinally coiled thermostat in which all turns of said coil are of equal diameter, said coil being adapted to wind and unwind due to temperature changes, and means responsive in its movement to the winding and unwinding action of said coil to vary the effective area of said passage.

3. In combination, a hydraulic shock absorber, and a thermostat therefor including a longitudinally wound bi-metal coil in which the two metals each have a different coefficient of expansion and in which there is provided at one end of said coil means for automatically regulating the flow of the cushioning liquid.

4. In combination, a hydraulic shock absorber, a thermostat therefor including a longitudinally wound bi-metal coil in which the two metals each have a different coefficient of expansion, means fastened to said coil at one end thereof for automatically regulating, as said coil expands and contracts due to temperature changes, the flow of the cushioning liquid, and means extending longitudinally of and within the embrace of said coil to reinforce it against buckling.

5. In combination, a hydraulic shock absorber, and a thermostat therefor including a coiled strip of two metals, each having a different coefficient of expansion, in which all turns of the coil firmly and continuously contact, edge to edge, under all operating conditions.

6. In combination, a hydraulic shock absorber, and a rigid non-yielding thermostat therefor including a single composite coiled strip of two layers of metal, each having a different coefficient of expansion, said strip, from end to end, being tightly coiled so that all turns of said strip firmly and continuously contact, edge to edge, under all operating conditions.

7. In combination, a hydraulic shock absorber, and a thermostat therefor capable of withstanding, without deformation, the enormously high pressures generated within the shock absorber, said thermostat comprising a tightly coiled strip in which all turns of the coil firmly and continuously contact, edge to edge, under all operating conditions, and a non-yielding rigid means extending longitudinally of and within the embrace of said coil, said means having an outside diameter only slightly smaller than the inside diameter of said strip.

8. In combination, a hydraulic shock absorber, and a thermostat therefor including a longitudinally wound bi-metal coil in which the two metals each have a different coefficient of expansion, means at one end of said coil to vary the effective area of the opening in the shock absorber thru which the cushioning liquid is passed, and fastened to said coil at the opposite end thereof a manually adjustable screw engaging with the wall of said shock absorber.

9. In combination, a hydraulic shock absorber having formed therein a chamber provided at one end with a valve seat and at its opposite end with internal screw threads, a valve movable in its relation to said valve seat, an adjusting screw engaging with the screw threads, and a thermostat comprising a coiled strip of two metals each having a different coefficient of expansion, said strip, at one end, being fastened to said adjusting screw and at its opposite end being fastened to said valve whereby, as said strip expands and contracts due to temperature changes or as said screw is adjusted, said valve is moved in its relation to said seat to regulate the flow of the cushioning liquid.

10. A shock absorber comprising, in combination, a casing providing a fluid reservoir and a cylinder; a piston in said cylinder forming a compression chamber therein; a piston operating member; a valve adapted to establish a restricted flow of fluid from the compression chamber into the reservoir in response to movements of the piston in one direction; a valve adjusting member manually operable to adjust said valve for varying the restriction to the flow of fluid; and a longitudinally coiled bimetallic temperature responsive member connected between said adjusting member and said valve for transmitting motion from said adjusting member to said valve, said temperature responsive member being also adapted to automatically adjust said valve in response to and in accordance with temperature changes.

11. A shock absorber comprising, in combination, a casing providing a fluid reservoir and a cylinder; a piston in said cylinder forming a compression chamber therein; a duct in the casing connecting the compession chamber with the fluid reservoir; a valve in said duct; an adjusting member; and a thermostatic element connected to said adjusting member and to said valve, said element being adapted automatically to rotate said valve in response to temperature changes and thus vary the flow of fluid thru said duct in accordance with said temperature changes, said thermostatic element being adapted also to adjust said valve in response to adjustments of said adjusting member.

12. A shock absorber comprising, in combination, a casing providing a fluid reservoir and a cylinder in which a fluid compression chamber is formed by a reciprocative piston; a duct provided for the escape of fluid from said chamber; a rotatable valve in said duct for restricting the flow of fluid therethrough; a manually operable adjusting member, and a bimetallic member providing an operative connection between the adjusting member and valve for rotating said valve in response to operation of the adjusting member and also for rotating said valve in response to and in accordance with temperature changes, independently of the operation of the adjusting member.

13. In a hydraulic shock absorber of the piston and cylinder type, the combination with a fluid compression chamber therein; a fluid exhaust duct; a rotatable valve in said duct adapted to restrict the flow of fluid through the duct; a manually operable valve adjusting member; and a temperature responsive element operatively connecting the said member with the valve so that said valve is rotatable with said member, said element, however, being adapted automatically to rotate the valve in response to and in accordance with temperature changes independently of the operation of the manually operable member.

14. A shock absorber comprising, in combination, a casing providing a fluid reservoir and a cylinder; a piston in said cylinder forming a compression chamber therein; a piston operating member; a three-way duct in said casing open to said reservoir, to said compression chamber and to the outside of the casing; a manually rotatable adjusting member mounted at the outer end of said duct; a valve within said duct, said valve being rotatably adjustable to restrict the flow of fluid through said duct in its passage from said compression chamber to said fluid reservoir, and a temperature responsive element secured at one end to said adjusting member and at its outer end to said valve and adapted to rotate said valve as said adjusting member is manually rotated, and also adapted automatically to rotate said valve in response to and in accordance with the temperature variations of the fluid within the casing.

15. A shock absorber comprising, in combination, a casing providing a fluid reservoir and a cylinder; a piston in said cylinder forming a compression chamber therein; a piston operating member; a three-way duct in said casing open to said reservoir, to said compression chamber and to the outside of the casing, at least two of said duct portions being in alignment and the other said duct portion extending off from said aligned portions at an angle; a manually rotatable adjusting member mounted at the outer end of said duct; a valve within said duct, said valve being rotatably adjustable to restrict the flow of fluid through that portion of said duct open to said fluid reservoir as the fluid is forced by said piston into said duct from said compression chamber; and a helically wound strip of bimetal attached to said adjusting member at one end and to said valve at the other end and providing a mechanical connection between the valve and the adjusting member so that the rotation of the latter will be transmitted to the valve, said bimetal strip, regardless of the position of adjustment of said adjusting member, being adaped to exert a twisting effort upon the valve to automatically turn it in response to and in accordance with varying temperatures of the fluid in the duct independently of rotation of the adjusting member.

16. In combination, a hydraulic shock absorber having formed therein a chamber provided at one end with a valve seat, a needle valve movable into and out of engagement with said seat, a manually adjustable screw engaging with the wall of said chamber at the opposite end thereof from said valve seat, and a thermostat capable of withstanding the enormously high fluid pressures generated within said chamber, said thermostat comprising a coiled strip of two metals, each having a different coefficient of expansion, fastened at one end to said screw and at its opposite end to said valve, said strip, from end to end, having all of its turns firmly and continuously contacting under all operating conditions whereby as said strip is subjected to varying temperatures, said valve is automatically moved either toward or away from said seat, and means extending longitudinally of and within the embrace of said strip, to reinforce it against buckling under pressure.

ADOLPH PETELER.